United States Patent
Tillement et al.

(10) Patent No.: US 8,127,819 B2
(45) Date of Patent: Mar. 6, 2012

(54) COMPOSITE LAY-UP HEAD WITH A RETRACTABLE DEVICE FOR SEPARATING A PREPREG FROM ITS SUPPORT TAPE

(75) Inventors: Pierre Andre Henri Tillement, Decazeville (FR); Stephane Robert Elie Charra, Figeac (FR)

(73) Assignee: Forest-Line Capdenac (FR)

( * ) Notice: Subject to any disclaimer, the term of this patent is extended or adjusted under 35 U.S.C. 154(b) by 59 days.

(21) Appl. No.: 12/598,645

(22) PCT Filed: Apr. 9, 2008

(86) PCT No.: PCT/FR2008/000493
§ 371 (c)(1),
(2), (4) Date: Feb. 24, 2010

(87) PCT Pub. No.: WO2008/142273
PCT Pub. Date: Nov. 27, 2008

(65) Prior Publication Data
US 2010/0139865 A1    Jun. 10, 2010

(30) Foreign Application Priority Data
May 4, 2007    (FR) .................................... 07 03222

(51) Int. Cl.
*B65C 9/18*    (2006.01)
(52) U.S. Cl. ......... 156/541; 156/247; 156/249; 156/542
(58) Field of Classification Search .................. 156/247, 156/249, 541, 542
See application file for complete search history.

(56) References Cited

U.S. PATENT DOCUMENTS

| | | | | |
|---|---|---|---|---|
| 3,962,397 A | * | 6/1976 | Narui et al. | 264/144 |
| 4,842,684 A | | 6/1989 | Tillement et al. | |
| 5,114,519 A | * | 5/1992 | Grimshaw et al. | 156/235 |
| 5,314,563 A | | 5/1994 | Grimshaw et al. | |
| 5,480,508 A | * | 1/1996 | Manabe et al. | 156/353 |
| 2005/0224166 A1 | * | 10/2005 | Whelan | 156/247 |
| 2007/0193671 A1 | * | 8/2007 | Yamamoto | 156/64 |
| 2007/0284049 A1 | * | 12/2007 | Ford et al. | 156/541 |

FOREIGN PATENT DOCUMENTS

| | | |
|---|---|---|
| EP | 0 144 927 A | 6/1985 |
| FR | 2888156 A | 1/2007 |
| WO | WO 2007/006879 | 1/2007 |

OTHER PUBLICATIONS

International Search Report dated Dec. 12, 2008, issued in corresponding international application No. PCT/FR2008/000493.

* cited by examiner

*Primary Examiner* — Mark A Osele
*Assistant Examiner* — Nickolas Harm
(74) *Attorney, Agent, or Firm* — Ostrolenk Faber LLP

(57) ABSTRACT

A lay-up head receives a prepreg bonded to a support tape, and the prepreg is separated from its support tape by peeling, by means of a separator just upstream of a depositing member for depositing the prepreg tape on a deposition tool; the head includes, downstream of the separator, a retractable device for moving the prepreg away from the support tape, allowing the prepreg to be moved away just upstream of the separator, by means of which the prepreg can be separated earlier when the retractable device is activated.

9 Claims, 1 Drawing Sheet

COMPOSITE LAY-UP HEAD WITH A RETRACTABLE DEVICE FOR SEPARATING A PREPREG FROM ITS SUPPORT TAPE

CROSS-REFERENCE TO RELATED APPLICATIONS

The present application is a 35 U.S.C. §§371 national phase conversion of PCT/FR2008/000493, filed Apr. 9, 2008, which claims priority of French Application No. 0703222, filed May 4, 2007, the disclosure of which is incorporated by reference herein. The PCT International Application was published in the French language.

BACKGROUND OF THE INVENTION

The invention relates to a lay-up head fitted with a device for separating prepreg from its backing tape.

It is known practice to automatically deposit on a mold or depositing tool, by virtue of a robot furnished with a lay-up head, a tape or a layer of fibers for the manufacture of various parts such as aircraft wings, from a composite tape consisting of fiber elements (carbon, glass, Kevlar®, etc.) that are bonded, by impregnation of a thermoplastic or heat-curable resin, and supported on a backing tape made of paper or of plastic film. The prepreg is made to pass beneath a depositing member of the lay-up head and is deposited on the mold or the tool by virtue of said depositing member, which may be, for example, a roller which if necessary is segmented.

U.S. Pat. No. 5,314,563 teaches of such methods for depositing composite by means of a lay-up head, in which the prepreg is brought up to the depositing member of the lay-up head on its backing tape, is deposited by virtue of a depositing member, the backing tape itself passing beneath the depositing member and then being rewound downstream of the depositing member.

Since such methods have drawbacks, the Applicant has produced and described in U.S. Pat. No. 4,842,684 a method in which the composite tape is paid out from a reel in order to pass over the lay-up head where the tape of prepreg fibers is separated from the backing tape. The backing tape is returned to a winding mandrel, while the prepreg is applied to the mold or the previous layers already deposited, by a depositing and compacting member usually consisting of a roller or an applicator shoe connected to the lay-up head. Unlike the methods of the prior art, the backing tape is separated from the prepreg just upstream of the depositing member.

Because of the shapes of the parts made, and notably the edges thereof, it is advisable not only to deposit "full width" sections of tape, with four sides, but also sections of various shapes obtained by complex cutting of the tape.

For through-cuts of simple shapes, a single-phase depositing process is used which comprises the cutting in situ of the strips to be deposited and their being immediately deposited by the same machine. A mechanical or ultrasound knife cuts the prepreg tape directly on its backing paper without cutting the latter which will be rewound onto the mandrel after peeling just upstream of the depositing member.

For strips to be cut of complex shape, the Applicant has produced a two-phase method according to which the cut is made upstream of the depositing method itself, with a first specialized machine in which the successive sections that are precut are deposited on the initial or repackaged backing tape between two protectors and wound onto a cassette subsequently installed on the lay-up head.

In order to provide the best possible guidance of the prepreg, the prepreg and its backing must be separated as close as possible to the depositing roller of the lay-up head, placed across the tape.

However, this requirement is difficult to meet when the successive cuts of the prepreg are placed on the backing tape in a manner that leads to seeing, side by side in one and the same transverse line of the tape, portions of two successive sections: this is the case notably when there is an oblique cut, for example at 45°, between two sections, where the tail of the first section is next to the head of the second section. In order to prevent the head of the second section passing beneath the depositing roller while the first section is not yet fully deposited, it is then necessary to maintain the distance between said roller and the separator at a distance greater than the overlap length of the two successive sections, that is to say greater than the width of the tape in the case of a 45° cut where the overlap length is equal to the width of the tape. This necessary distance is therefore greater than would be desirable if it were not made essential because of the oblique cut, and notably in the normal case of a simple crosswise cut. The result of this is a risk of incorrect guidance of the prepreg tape.

In order to remedy this problem, the Applicant has described, in French Publication FR 2 888 156, a lay-up head of a prepreg tape in which a prepreg tape juxtaposed to a backing tape is separated from its backing tape by peeling by means of a separator just upstream of a member for depositing the prepreg tape on a depositing tool, and in which the distance between the separator and the depositing member is adjustable by virtue, for example, of a movable carriage. This distance is adjustable during deposition between a minimum value in which the separator and the depositing member are very close to one another and a maximum value in which they are separated by a distance at least equal to the width of the tape (for a 45° cut), in order to allow the separation of the backing in the case of successive sections separated by an oblique cut.

This device gives perfect satisfaction, but requires a certain space to obtain the rigidity that is compatible with the requirements of depositing precision.

SUMMARY OF THE INVENTION

The object of the invention is therefore to propose an alternative solution to the problem of separating the prepreg.

The invention achieves its objective thanks to a lay-up head of a prepreg in which a prepreg juxtaposed to a backing tape is separated from its backing tape by peeling by means of a separator just upstream of a member for depositing the prepreg tape on a depositing tool. Between the separator and the depositing means, there are retractable means for separating the prepreg from the backing tape, allowing the prepreg to be separated from its backing just upstream of the separator. As a result, the prepreg can be separated earlier when these means are activated.

In practice, while the strips of prepreg end in a straight manner, the auxiliary separation means remain retracted and the separator carries out alone and normally the separation of the prepreg from its backing by peeling. When the strips of prepreg terminate in an inclined manner (relative to the trajectory of the product), the auxiliary separation means are activated and, in addition to the separator, carry out the peeling early by being inserted between the prepreg and its backing until the end of the strip being deposited is detached from its backing. The auxiliary separation means then return to their retracted position.

Advantageously, the retractable separation means comprise at least one separation member capable of moving between a first, retracted, position in which it is outside the trajectory of the prepreg and a second, active, position in which it diverts the trajectory of the prepreg in the vicinity of the separator, in order to separate the prepreg and unstick it from the backing tape in advance of the separator.

Advantageously, the separation member in its second, active, position travels round the separator in order to rise again upstream of the prepreg, so as to more efficiently achieve this advance unsticking.

Advantageously, the retractable separation means comprise a support of the member mounted on pivoting means and means for sliding relative to the lay-up head.

Advantageously, the retractable separation means can be controlled by means of a cam and a following roller making it possible to carry out the two movements based on one translation movement. These two movements can also be carried out sequentially by virtue of two independent actuators, one controlling the tilting and the other the translation. These actuators may be pneumatic, electric, hydraulic, etc.

In practice, a carriage supports two link rods to which the auxiliary separation means are attached. The carriage has a sliding connection which allows it to move parallel to the travel of the product by virtue of a driving system. The connection that links the link rods to the carriage is a pivot link.

Advantageously, the separation member is a wire or a separation roller, or preferably two small separation rollers, or any other element that can easily be inserted between the backing and the prepreg.

The advantages of the solution of the invention are as follows.

Since the peeling edge forming the separator is fixed, it can be placed close to the depositing member and thus improve the guidance of the prepreg strips.

The rigidity necessary for the auxiliary separation means is secondary because the guidance is carried out by the fixed separator. The bulk of the assembly is therefore smaller than in the previously known solution.

The necessary peeling force is that of unsticking the prepreg from the paper backing, so it is no longer necessary to overcome the tension force of the product and the paper.

Finally, the auxiliary separation means unstick the end of the strip which is being deposited without unsticking the point of the next cut.

Since the lay-up head of the invention makes it possible more easily to carry out complex unsticking operations, it is possible and advantageous to use a backing tape which supports, on the one hand, matching cuts of prepreg separated by simple through-cut lines and, on the other hand, complex cuts of prepreg separated by trimmings that have been removed. The first cuts are the conventional cuts used in the single-phase method mentioned above and the second cuts are the cuts that are used conventionally in the two-phase method and that require prior repackaging. Since it is often necessary to use both methods on one and the same complex aviation part, it is routine to use a double head in order to prevent having to change reels too frequently in order to switch from one method to the other. Nevertheless, a double head poses problems of weight on board the head, said problems being all the more difficult to resolve when it is desired at the same time to make the heads yet more mobile along yet more axes or directions. Thanks to the invention, it is possible to combine the methods on one and the same head, whether the user makes all the cuts with appropriate knives (for example ultrasonic knives) on the lay-up head itself, or the user makes a specialized cut upstream of the lay-up and a general repackaging on cassette.

Other features and advantages of the invention will appear on reading the following description with reference to the appended drawings in which:

DESCRIPTION OF A PREFERRED EMBODIMENT

Figure 1:
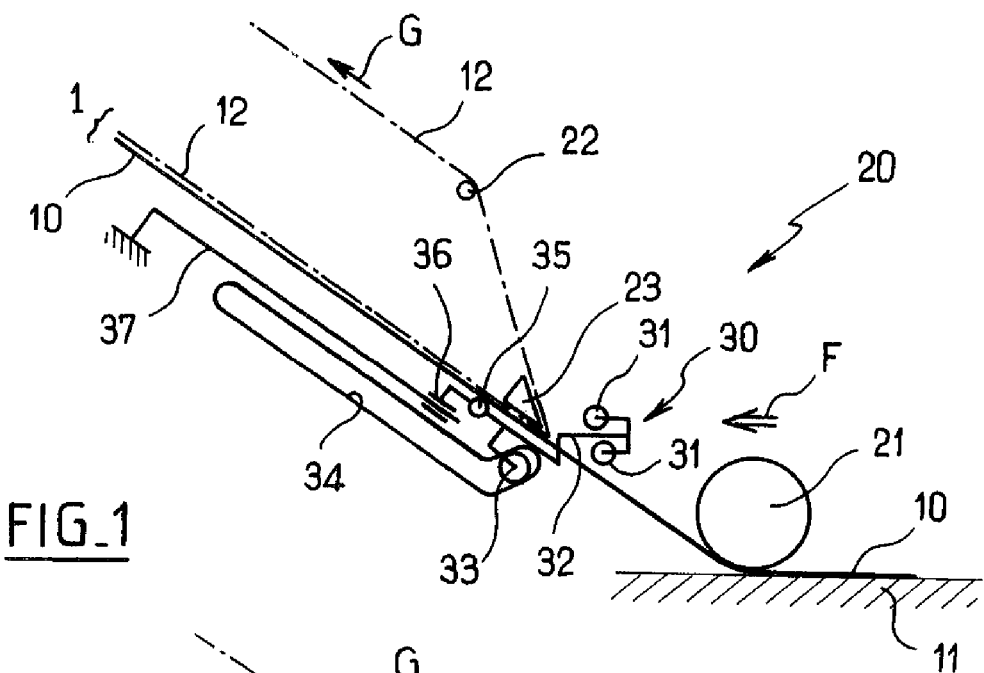
FIG. 1 is a schematic side view of the end of the lay-up head in the retracted position of the prepreg separation rollers according to the present invention.
Figure 2:
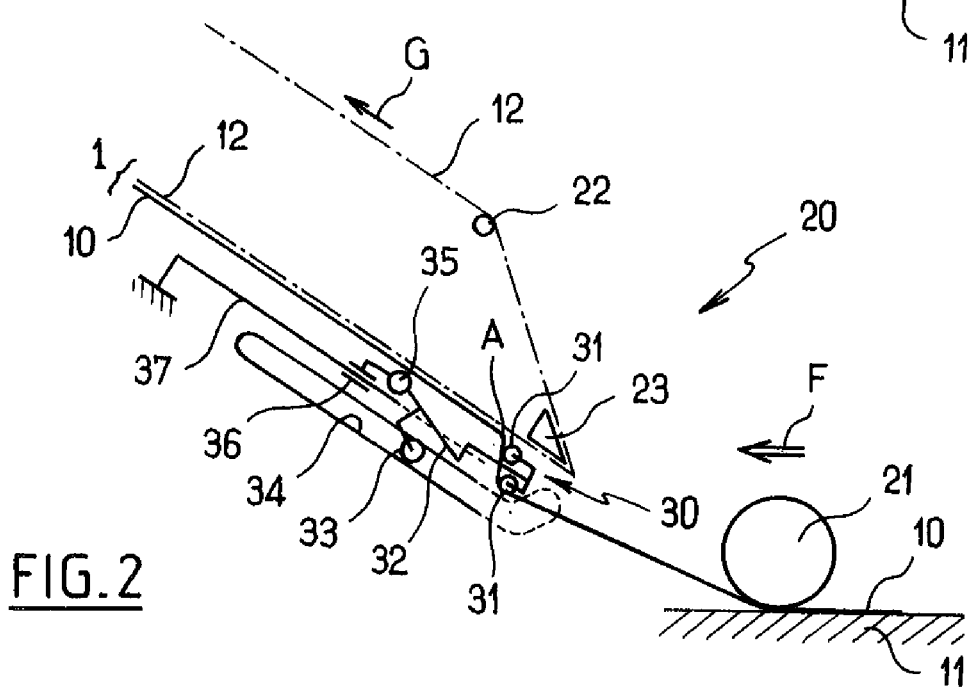
FIG. 2 is a schematic side view of the end of the lay-up head in the active position of the prepreg separation rollers according to the present invention.

FIGS. 1 and 2 are shown in a schematic and functional manner in order to simplify understanding of the invention. Reference may be made for more comprehensive explanations on a lay-up head to the patents cited at the beginning of this document.

The lay-up head 20 according to the invention essentially comprises a depositing roller 21 and a separator in the form of a peeling edge 23. These two elements are fixed relative to one another and are on board the lay-up head 20, which can be moved in a certain number of directions, usually at least 5.

Figure 3:
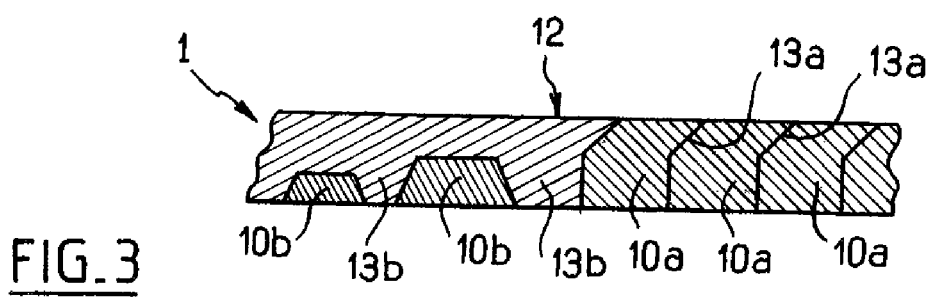
FIG. 3 is a view of a backing tape supporting various sorts of prepreg cuts that can advantageously be used in the lay-up head according to the invention.

The complex 1 is provided from a cassette on board the head 20 and not shown. It takes the shape of a complex tape 1 comprising on the one hand a continuous paper backing tape 12 (the path of which is shown in dot-and-dash lines in FIGS. 1 and 2) and, on the other hand, pieces of composite or prepreg material 10 which adhere to the paper 12 and are not continuous but, on the contrary (see FIG. 3), form successive cuts 10a, 10b which are more or less long and separated by free spaces 13b corresponding to trimmings which have been removed or of simple through-cut lines 13a (the path of the pieces 10 is nevertheless shown in solid line). The cuts of prepreg 10 follow a rectilinear trajectory up to a depositing roller 21 in order to be deposited by the latter on a depositing tool 11, such as a mold, above which the depositing roller 21 presses while moving in the direction of the arrow F. To do this, the prepreg has been separated from its backing paper 12 just before deposition by the peeling edge 23, placed as close as possible to the depositing roller. The peeling edge 23 returns the paper 12 to a roller 22 and from there, to a winding mandrel not shown, on board the lay-up head 20 and applying a constant tension in the direction of the arrow G.

According to the invention, the lay-up head 20 comprises retractable means 30 for separating the prepreg 10 from its backing paper 12. These auxiliary separating means 30 comprise two small rollers 31 mounted free at the end of a support 32 capable of a movement which causes the rollers 31 to travel from a first, retracted, position, FIG. 1, where they are placed above the path of the prepreg, just downstream of the peeling edge 23 to a second, active, position, FIG. 2, where the rollers 31 travel round the peeling edge in front and underneath, so as to press and push down the prepreg 10 and separate it from its previous rectilinear trajectory. When the rollers 31 slide under the peeling edge 23, they force the prepreg 10 to unstick in advance from the backing paper 12 in a zone A situated upstream of the peeling edge 23. The prepreg then, after having passed over the rollers 31, returns to the depositing roller 21.

The support 32 of the rollers 31, in order to allow this movement around the peeling edge 23, comprises sliding mounting means and pivoting mounting means. The support 32 is mounted so as to pivot on a pivot link 35, which is itself mobile in translation by virtue of a sliding connection of a runner 36 and of a rail 37 on board the lay-up head. The support 32 comprises a roller 33 following a cam 34 the laid-down L-shaped profile of which controls, on the short branch of the L, the lowering of the rollers 31 below the normal trajectory of the prepreg, and on the long branch of the L, the translation upstream of the peeling edge 23 in order to "raise" the separation of the prepreg 10 and of its backing paper 12.

The figures show the path of the prepreg 10 and of its backing 12 in rectilinear form upstream of the depositing roller. The invention also applies to the situation in which the path is curvilinear (for example substantially in a convex arc of a circle); this arrangement releases more space in the vicinity of the head and strengthens the grip of the tape which is carried along this path. In this arrangement, the retraction means must be adapted to this curvature and may comprise, for example, a belted device.

The invention claimed is:

1. A lay-up head for depositing a prepreg, wherein a tape comprises a prepreg juxtaposed to a backing tape and the prepreg is separated from the backing tape by peeling;
   the lay-up head comprising a separator configured for redirecting the backing tape from an advancing direction path of the prepreg to separate the backing tape away from the prepreg just upstream of a depositing member along the advancing direction, the depositing member configured and operable for depositing the prepreg on a depositing tool or object, wherein the separator is upstream with respect to the advancing direction of the prepreg from the depositing member;
   a retractable separation device in a retracted position located downstream from the separator in the advancing direction of the prepreg, the separation device is movable from the retracted position into an activated position where it is positioned, configured and operable for separating the prepreg from the backing tape upstream of the separator, whereby the prepreg can be separated from the backing tape earlier when the separation device is in the activated position.

2. The lay-up head as claimed in claim 1, wherein the separation device comprises at least one separation member configured for moving between the retracted position in which the at least one separation member is outside a trajectory of the prepreg in the advancing direction of the prepreg, and the activated position in which the at least one separation member is positioned to divert the trajectory of the prepreg in the vicinity of the separator.

3. The lay-up head as claimed in claim 2, wherein the at least one separation member travels around the separator into its activated position to upstream of the prepreg against the advancing direction of the prepreg.

4. The lay-up head as claimed in claim 3, wherein the retractable separation device comprises a support for the at least one separation member and the support is mounted on a pivot of the lay-up head to pivot between the activated and the retracted position and a sliding device configured for sliding relative to the lay-up head as the retractable separation device moves between the activated and the retracted positions.

5. The lay-up head as claimed in claim 4, further comprising a cam configured for guiding a path of the at least one separation member along the backing tape and a following roller on the at least one separation member configured for being guided on the cam, wherein the retractable separation device is controlled by the roller guided on the cam with respect to movement of the at least one separation member along the backing tape.

6. The lay-up head as claimed in claim 5, wherein the at least one separation member comprises a separation roller.

7. The lay-up head as claimed in claim 2, wherein the at least one separation member comprises a wire.

8. The lay-up head as claimed in claim 2, wherein the separator comprises a peeling edge.

9. The lay-up head as claimed in claim 1, wherein the backing tape supports cuts of prepreg separated by simple cut lines and cuts of prepreg separated by spaces corresponding to trimmings.

* * * * *